(12) United States Patent
Wang et al.

(10) Patent No.: US 12,015,293 B2
(45) Date of Patent: Jun. 18, 2024

(54) MULTI-PORT ENERGY STORAGE BATTERY

(71) Applicant: FranklinWH Technologies Co., Ltd., Guangdong (CN)

(72) Inventors: Daqing Wang, Guangdong (CN); Yuezhen Hu, Guangdong (CN); Haisheng Song, Guangdong (CN)

(73) Assignee: FranklinWH Technologies Co., Ltd., Shenzhen (CN)

( * ) Notice: Subject to any disclaimer, the term of this patent is extended or adjusted under 35 U.S.C. 154(b) by 369 days.

(21) Appl. No.: 17/560,370

(22) Filed: Dec. 23, 2021

(65) Prior Publication Data

US 2022/0115884 A1   Apr. 14, 2022

Related U.S. Application Data

(63) Continuation of application No. PCT/CN2020/096049, filed on Jun. 15, 2020.

(30) Foreign Application Priority Data

May 26, 2020   (CN) .......................... 202010457131.8

(51) Int. Cl.
*H01M 10/46* (2006.01)
*H02J 7/00* (2006.01)

(52) U.S. Cl.
CPC ......... *H02J 7/0044* (2013.01); *H02J 2207/40* (2020.01)

(58) Field of Classification Search
CPC .......... H02J 7/0044; H02J 7/35; H02J 7/0063; H02J 2207/40

USPC .................................. 320/107, 112, 114, 115
See application file for complete search history.

(56) References Cited

U.S. PATENT DOCUMENTS

2014/0285020 A1   9/2014   Yang et al.

FOREIGN PATENT DOCUMENTS

| CN | 102290999 A | 12/2011 |
| CN | 204905915 U | 12/2015 |
| CN | 107508331 A | 12/2017 |
| CN | 110098658 A | 8/2019 |

OTHER PUBLICATIONS

International Search Report of PCT Patent Application No. PCT/CN2020/096049 issued on Feb. 24, 2021.

*Primary Examiner* — Edward Tso

(57) ABSTRACT

The present application discloses a multi-port energy storage battery. The multi-port energy storage battery comprises a battery case including a first port, a second port and a third port; a battery module, including a first interface, the first interface is connected to the first port, the battery module is configured to connect an external power supply module via the first port and first interface, so as to charge the battery module; a DC-DC converter, including a second interface and a third interface, the second interface is connected with the first interface, and the third interface is connected with the second port, the DC-DC converter is configured to boost battery voltage to a DC high voltage and then output it through the second port; a DC-AC converter, including a fourth interface and a fifth interface, the fourth interface is connected with the first interface, the fifth interface and the third port.

9 Claims, 3 Drawing Sheets

MULTI-PORT ENERGY STORAGE BATTERY

CROSS REFERENCE TO RELATED APPLICATIONS

The present application is a Continuation Application of PCT Application No. PCT/CN2020/096049 filed on Jun. 15, 2020, which claims the priority of Chinese patent application No. 202010457131.8, filed with China Patent Office on May 26, 2020, the contents of which are incorporated herein by reference in their entirety.

TECHNICAL FIELD

The present disclosure relates to battery technology, and in particular to a multi-port energy storage battery.

BACKGROUND

In recent years, with the development of new energy sources, photovoltaic systems are more and more used in households, especially in well-lit areas, where photovoltaic power generation has brought tangible benefits to people.

Photovoltaic power generation can be carried out during the day, but after the sun goes down, it is impossible to continue photovoltaic power generation and use solar energy. With the development of lithium battery, this problem has been solved. Household battery system, or household battery pack, can cooperate with photovoltaic system to store solar energy in the battery pack by charging the battery during the day, and then release the electricity of the battery pack at night for household use.

This solution can certainly solve the problem of solar energy storage, but because there are many brands and models of photovoltaic DC (Direct Current)-AC (Alternating Current) converter cooperating with batteries, the photovoltaic DC-AC converter put into use earlier have no battery interface, or the voltage levels of battery interfaces are inconsistent, for example, some voltage levels are 400V, others are 48V and so on. This brings a lot of problems. Once the user selects a certain photovoltaic DC-AC converter, when matching the energy storage solutions, there are few battery solutions to choose, and the related batteries have poor expandability and substitutability, which makes the investment income of solar energy decline and affects the user experience.

SUMMARY

The present application provides a multi-port energy storage battery to realize that the battery can adapt to different voltage levels and voltage types.

A multi-port energy storage battery, includes:
a battery case, including a first port, a second port and a third port;
a battery module, including a first interface, the first interface is connected to the first port, the battery module is configured to connect an external power supply module via the first port and the first interface, so as to charge the battery module;
a DC-DC converter, including a second interface and a third interface, wherein the second interface is connected with the first interface, and the third interface is connected with the second port; the DC-DC converter is configured to boost a battery voltage to a DC high voltage and then output the DC high voltage via the second port;
a DC-AC converter, including a fourth interface and a fifth interface, wherein the fourth interface is connected with the first interface, and the fifth interface is connected with the third port; the DC-AC converter is configured to convert the battery voltage into an alternating current and then output the alternating current via the third port.

The reference sign in the figures are as follows,
Battery Case 100; Battery Module 200; DC-DC converter 300; DC-AC converter 400;
Control Module 500; Wireless Communication Module 600
First Port 110; Second Port 120; Third Port 130
First Interface 210
Second Interface 310; Third Interface 320
Fourth Interface 410; Fifth Interface 420
First Switch 510; Second Switch 520; Microprocessor 530

DETAILED DESCRIPTION OF DISCLOSED EMBODIMENTS

The application will be described in further detail with reference to the drawings and embodiments.

It should be understood that the terms "first", "second" and the like can be used herein to describe various directions, actions, steps or elements and the like, but these directions, actions, steps or elements are not limited by these terms. These terms are only used to distinguish a (an) direction, action, step or element from another direction, action, step or element. For example, without departing from the scope of this application, the first module can be referred to as the second module, and similarly, the second module can be referred to as the first module. The first module and the second module are both modules, but they are not the same module. The terms "first", "second" and so on cannot be understood as indicating or implying relative importance or implicitly indicating the number of the said technical features. Thus, the features defined by "first" and "second" may explicitly or implicitly include one or more of the features. In the description of the embodiments of this application, "plural" means at least two, such as two, three, etc., unless otherwise specifically defined. Further, the singular terms "a", "an" and "the" include plural reference and vice versa unless the context clearly indicates otherwise.

Embodiment 1

Figure 1:
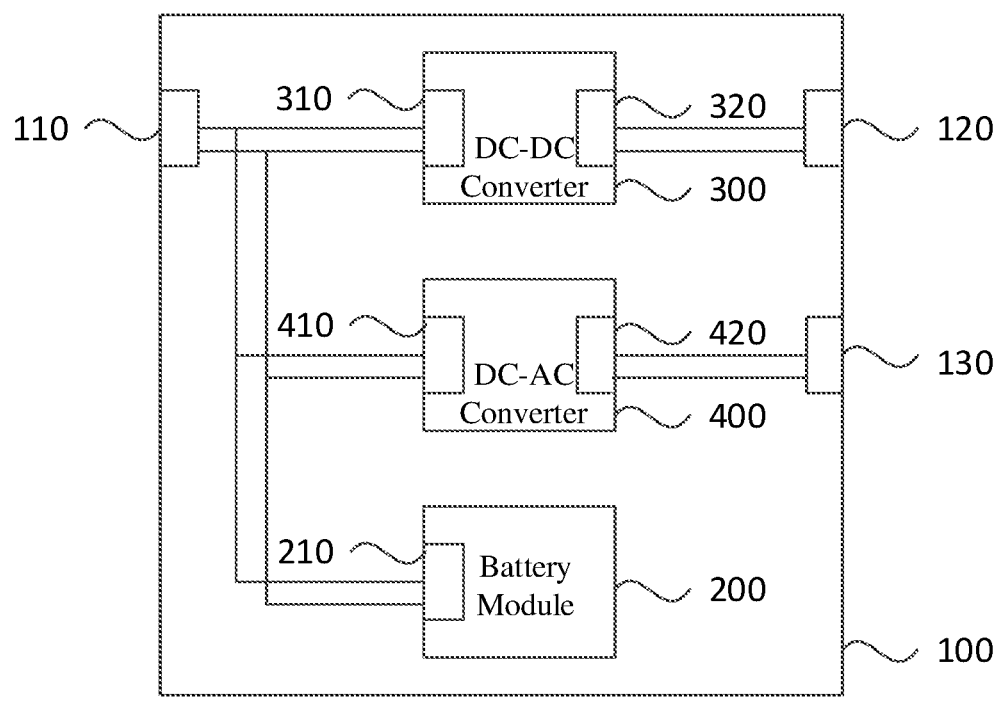
FIG. 1 is a structural schematic diagram of a multi-port energy storage battery provided in the Embodiment one of the present application.

As shown in FIG. 1, the first embodiment of the present application provides a multi-port energy storage battery, which includes a battery case 100, a battery module 200, a DC-DC converter 300 and a DC-AC converter 400.

The battery case 100 includes a first port 110, a second port 120 and a third port 130; the battery module 200 includes a first interface 210, the first interface 210 is connected with the first port 110; the battery module 200 is configured to be connected with an external power supply module via the first port 110 and first interface 210 for charging. A DC-DC converter 300 includes a second interface 310 and a third interface 320, the second interface 310 is connected with the first interface 210, and the third interface 320 is connected with the second port 120. The DC-DC converter 300 is configured to boost a battery voltage to a high DC voltage and then output it via the second port 120. The DC-AC converter 400 includes a fourth interface 410 and a fifth interface 420. The fourth interface 410 is connected with the first interface 210, and the fifth interface 420 is connected with the third port 130. The DC-AC converter 400 is configured to convert a battery voltage into an alternating current and then output it via the third port 130. The battery module 200 is further configured to be connected to an external power supply module via the second port 120, DC-DC converter 300 and first interface 210 for charging. The battery module 200 is further configured to be connected to an external power supply module via the third port 130, DC-AC converter 400 and first interface 210 for charging.

In this embodiment, the multi-port energy storage battery can be used in any scenarios requiring charging and discharging. When charging is required, if the charging voltage provided by the external power supply module is the same as the battery voltage of the battery module 200, for example, both are 48V DC, the external power supply module can be directly connected to the first port 110, and then the external power supply module can charge the battery module 200 via the first port 110 and the first interface 210. If the charging voltage provided by the external power supply module is DC high voltage, such as 400V DC, the external power supply module needs to be connected to the second port 120 in this case. The external power supply module charges the battery module 200 via the second port 120, the third interface 320, the second interface 310 and the first interface 210, that is, the charging voltage provided by the external power supply module needs to be stepped down to 48V DC by the DC-DC converter 300 before charging the battery module 200. If the charging voltage provided by the external power supply module is AC, such as 220V AC, the external power supply module needs to be connected to third port 130 in this case. The external power supply module charges the battery module 200 via the third port 130, the fifth interface 420, the fourth interface 410 and the first interface 210, that is, the charging voltage provided by the external power supply module needs to be converted into 48V DC by the DC-AC converter 400 before charging the battery module 200.

When discharging is required, if the user's required voltage is the same as the battery voltage of battery module 200, for example, both are 48V DC, the consumer appliance can be directly connected to the first port 110, and then battery module 200 can output the working voltage to the consumer through via the first interface 210 and first port 110. If the user's required voltage is DC high voltage, such as 400V DC, the consumer appliance needs to be connected to the second port 120 in this case. The battery module 200 outputs the working voltage to the consumer appliance via the first interface 210, the second interface 310, the third interface 320 and the second port 120, that is, the working voltage provided by the battery module 200 needs to be boosted to 400V DC by the DC-DC converter 300 before being output to the consumer appliance. If the user's required voltage is AC, such as 220V AC, the consumer appliance needs to be connected to the third port 130 in this case. The battery module 200 outputs the working voltage to the consumer appliance via the first interface 210, the fourth interface 410, the fifth interface 420 and the third port 130, that is, the working voltage provided by the battery module 200 needs to be converted into 220V AC by the DC-AC converter 400 before being output to the consumer appliance.

The embodiment of this application provides a battery case 100, including a first port 110, a second port 120 and a third port 130; and a battery module 200, including a first interface 210, the first interface 210 is connected to the first port 110, and the battery module 200 is configured to connect an external power supply module via a first port 110 and first interface 210 for charging. A DC-DC converter 300, including a second interface 310 and a third interface 320, the second interface 310 is connected with the first interface 210, the third interface 320 is connected with the second port 120, and the DC-DC converter 300 is configured to boost a battery voltage to a DC high voltage and then output it via the second port 120; A DC-AC converter 400, including a fourth interface 410 and a fifth interface 420, the fourth interface 410 is connected with the first interface 210, and the fifth interface 420 is connected with the third port 130. The DC-AC converter 400 is configured to convert a battery voltage into an alternating current and then output it through the third port 130. The above solves the docking adaptability problem of the battery and realizes the effect that the battery can adapt to different voltage levels and voltage types.

Embodiment 2

Figure 2:
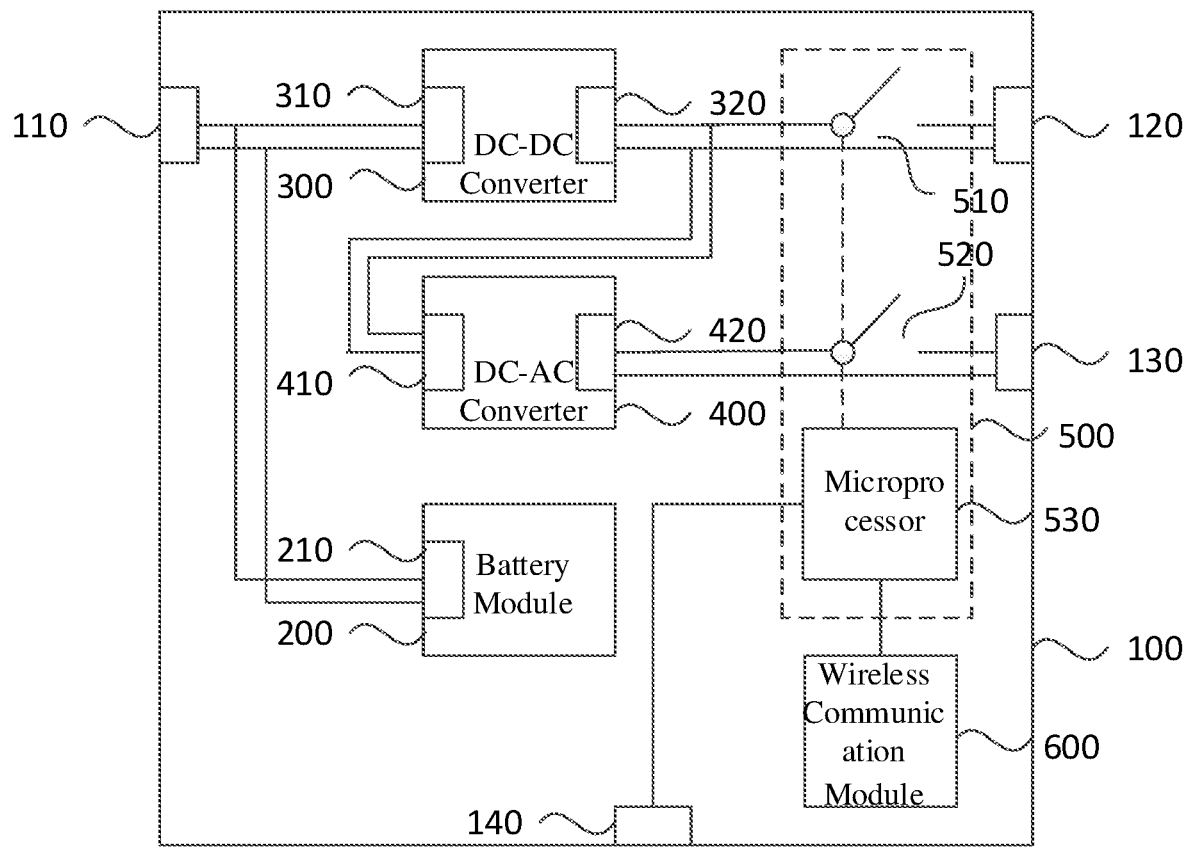
FIG. 2 is a structural schematic diagram of a multi-port energy storage battery provided in the Embodiment two of the present application.

As shown in FIG. 2, the second embodiment of this application provides a multi-port energy storage battery, which is an improvement based on Embodiment 1 of this application. The multi-port energy storage battery provided by this embodiment further includes a control module 500 and a wireless communication module 600.

The control module 500 includes a first switch 510 installed in the second port 120, a second switch 520 installed in the third port 130 and a microprocessor 530, the microprocessor 530 is configured to control the opening and closing of the first switch 510 and the second switch 520. The wireless communication module 600 is connected with the microprocessor 530. The wireless communication module 600 is configured to receive wireless control instructions to control the microprocessor 530. The battery case 100 may further include a communication port 140, and the microprocessor 530 is configured to connect with an external host computer via the communication port 140, which supports RS (Recommendation Standard)-485 or CAN bus (Controller Area Network) communication protocol.

In this embodiment, the battery case 100 is configured to house the battery module 200, DC-DC converter 300 and DC-AC converter 400 inside the battery case 100. The third interface 320 is further connected to the fourth interface 410, and the fourth interface 410 is connected via the third interface 320, DC-DC converter 300, second interface 310 and first interface 210. The DC-AC converter 400 is also configured to convert DC high voltage into alternating current and output it through the third port 130. The battery module 200 is further configured to be connected to an external power supply module via the second port 120, DC-DC converter 300 and first interface 210 for charging. The battery module 200 is further configured to be connected to an external power supply module via the third port 130, DC-AC converter 400, DC-DC converter 300 and first interface 210 for charging.

The external power supply module includes a photovoltaic DC-AC converter. The multi-port energy storage battery can be used in the scene of charging and discharging between the photovoltaic DC-AC converter and the battery of the household photovoltaic system. The capacity requirement for household energy storage can be 10 kWh. Accordingly, the battery module 200 is set as a 48V low-voltage system. When charging through the photovoltaic DC-AC converter during the day, if the charging voltage of the interface provided by the photovoltaic DC-AC converter is the same as the battery voltage of the battery module 200, both of which are 48V DC, the photovoltaic DC-AC converter can be directly connected to the first port 110. Then, the photovoltaic DC-AC converter can charge the battery module 200 via the first port 110 and the first interface 210. If the charging voltage of the interface provided by the photovoltaic DC-AC converter is DC high voltage, such as 400V DC, the photovoltaic DC-AC converter needs to be connected to the second port 120 in this case. The battery module 200 is charged by the photovoltaic DC-AC converter via the second port 120, the third interface 320, the second interface 310 and the first interface 210, that is, the charging voltage provided by the photovoltaic DC-AC converter needs to be reduced to 48V DC by the DC-DC converter 300 before charging the battery module 200. If the photovoltaic DC-AC converter does not provide an interface, the commercial power provided by the photovoltaic system to users, such as 220V AC power or 120/240V split-phase AC power, can be directly used to connect the commercial power to third port 130. The commercial power charges the battery module 200 via the third port 130, the fifth interface 420, the fourth interface 410, the third interface 320, the DC-DC converter 300, the second interface 310, and the first interface 210, that is, the charging voltage provided by commercial power needs to be converted into 48V DC by DC-AC converter 400 and DC-DC converter 300 before charging the battery module 200.

When the photovoltaic system can't supply power at night and the multi-port energy storage battery needs to be discharged, if the required voltage of the user is the same as the battery voltage of the battery module 200, for example, both are 48V DC, the user can control the wireless communication module 600 to send a communication signal to release 48V DC through the mobile phone. The wireless communication module 600 then controls the microprocessor 530 to disconnect the first switch 510 and the second switch 520, or controls the host computer to send a communication signal to release 48V DC. Then, the host computer controls the microprocessor 530 via the communication port 140, so that the first switch 510 and the second switch 520 are disconnected, users can directly access the first port 110 with consumer appliance, and then the power module can output the working voltage to the users via the first interface 210 and the first port 110. If the user's required voltage is DC high voltage, such as 400V DC, the user can control the wireless communication module 600 to send out a communication signal to release 400V DC through the mobile phone. The wireless communication module 600 then controls the microprocessor 530 to turn the first switch 510 on and the second switch 520 off, or by controlling the host computer to send a communication signal to release 400V DC. The host computer then controls the microprocessor 530 via the communication port 140, so that the first switch 510 is closed and the second switch 520 is disconnected, and then the consumer appliance is connected to the second port 120. The power module 200 outputs the working voltage to the consumer appliance via the first interface 210, the second interface 310, the third interface 320 and the second port 120, that is, the working voltage provided by the battery module 200 needs to be boosted to 400V DC by the DC-DC converter 300 before being output to the consumer appliance.

If the user's required voltage is AC, that is, when the multi-port energy storage battery is directly connected to the home power grid, such as AC of 220V, 230V or 120/240V split-phase, the user can control the wireless communication module 600 to send communication signals to release AC of 220V, 230V or 120/240V split-phase through the mobile phone. The wireless communication module 600 then controls the microprocessor 530 to turn off the first switch 510 and turn off the second switch 520, or controls the host computer to send out a communication signal to release the alternating current of 220V, 230V or 120/240V split-phase. The host computer then controls the microprocessor 530 via the communication port 140, so that the first switch 510 is turned off and the second switch 520 is turned off. At this time, the home power grid needs to be connected to the third port 130, the battery module outputs working voltage to home power grid via the first interface 210, second interface 310, DC-DC converter 300, third interface 320, fourth interface 410, fifth interface 420 and third port 130, that is, the working voltage provided by the battery module 200 needs to be converted into 220V, 230V or 120/240V split-phase AC power by the DC-DC converter 300 and the DC-AC converter 400 before being output to the home grid. Third port 130 includes three interfaces: zero line, live line and three interfaces of output live line. Adaptively, the user can also control the first switch 510 and the second switch 520 to be closed at the same time, so as to meet the user's requirement of using AC and DC at the same time. The specific control steps and current flow direction are the same as those described above, and the embodiment of this application will not be repeated here.

Figure 3:
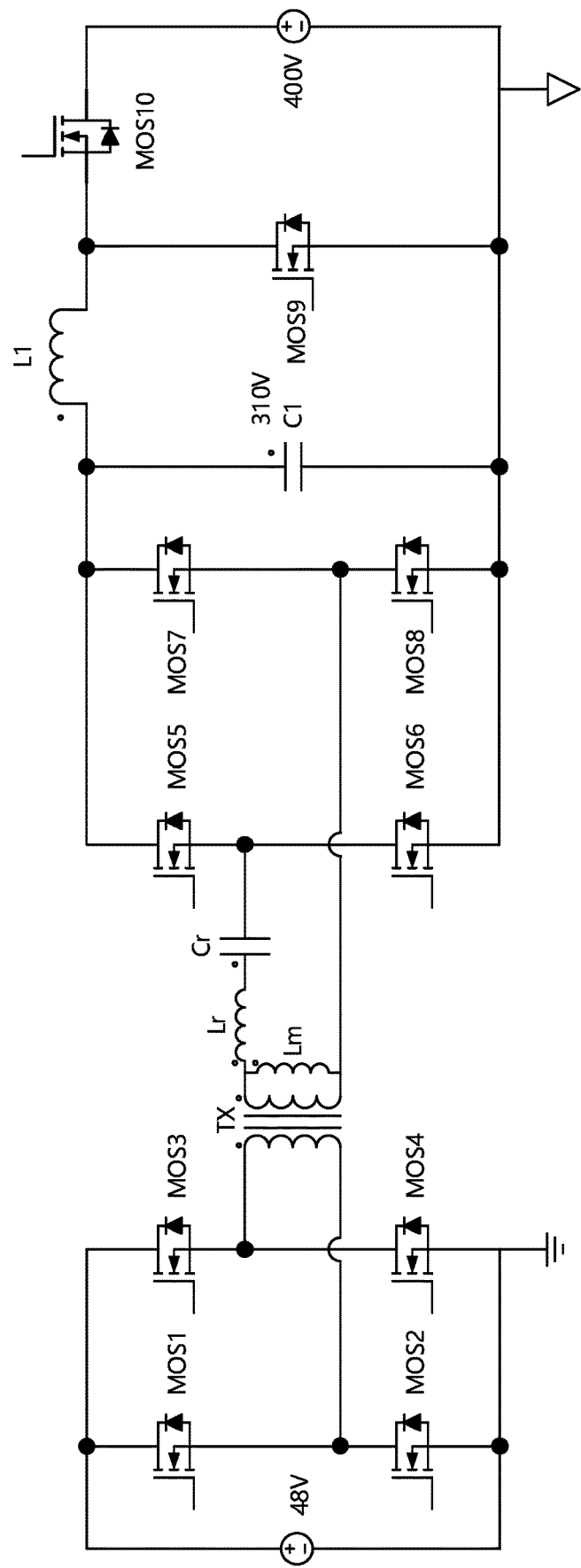
FIG. 3 is a structural schematic diagram of a DC-DC converter provided in the Embodiment two of the present application.
Figure 4:
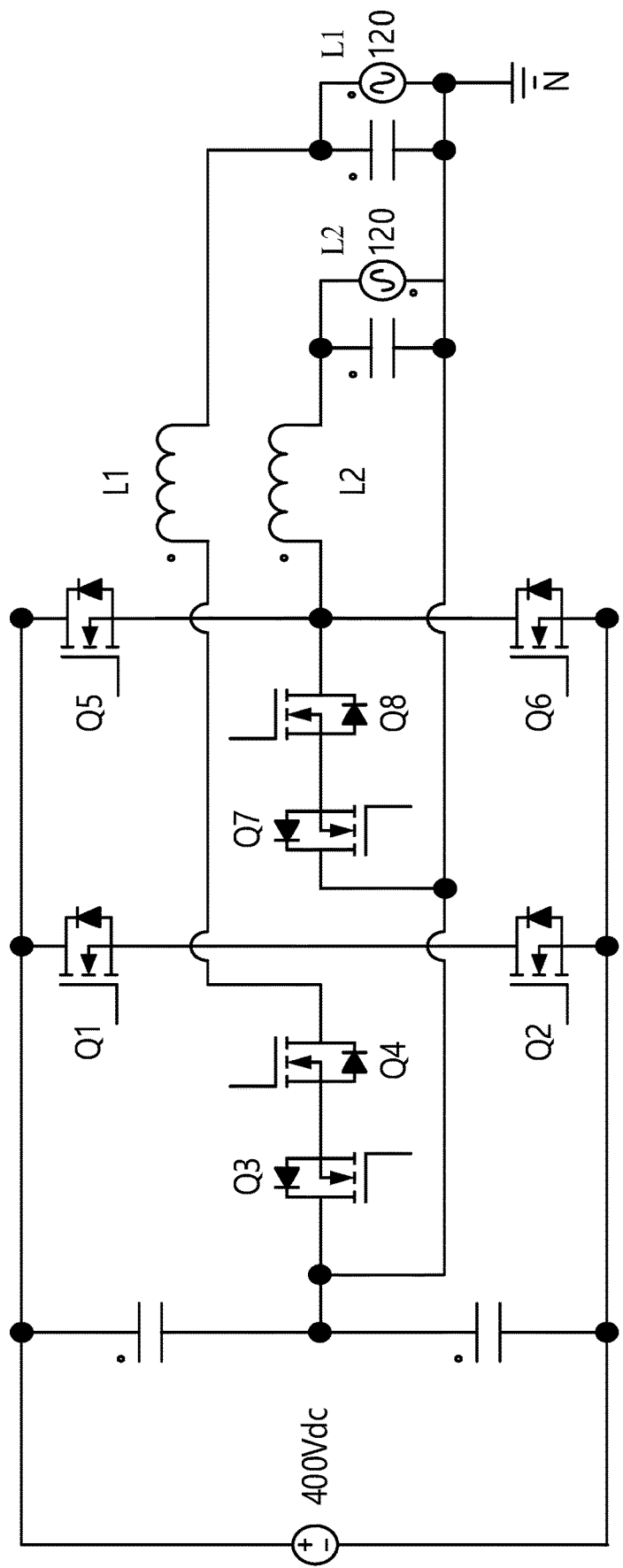
FIG. 4 is a structural schematic diagram of a DC-AC converter provided in the Embodiment two of the present application.

As shown in FIG. 3, the DC-DC converter 300 in this embodiment is composed of LLC (resonant circuit), BUCK (step-down converter circuit) or two-stage BOOST (boost chopper) converter, including MOS transistors, capacitors, inductors, etc., which can convert 48V DC to 400 V DC, and also can reverse the 400V DC to 48V DC. As shown in FIG. 4, the DC-AC converter 400 in this embodiment is a T-shaped three-level DC-AC converter, which includes triodes, capacitors, inductors, etc., and can convert 400V DC into 120/240V split-phase AC. Similarly, it can reverse the 120/240V split-phase AC into 400V DC.

In an alternative embodiment, the multi-port energy storage battery may further include a fourth port and a fifth port, and a DC-DC converter 300 or a DC-AC converter 400 may be included adaptively, so as to provide input and output interfaces for different voltage levels and voltage types.

The embodiment of this application provides a battery case 100, including a first port 110, a second port 120 and a third port 130; and a battery module 200, including a first interface 210, the first interface 210 is connected to the first port 110, and the battery module 200 is configured to connect an external power supply module via a first port 110 and first interface 210 for charging. A DC-DC converter 300, including a second interface 310 and a third interface 320, the second interface 310 is connected with the first interface 210, the third interface 320 is connected with the second port 120, and the DC-DC converter 300 is configured to boost a battery voltage to a DC high voltage and then output it via the second port 120; A DC-AC converter 400, including a fourth interface 410 and a fifth interface 420, the fourth interface 410 is connected with the first interface 210, and the fifth interface 420 is connected with the third port 130. The DC-AC converter 400 is configured to convert a battery voltage into an alternating current and then output it through the third port 130. The application solves the docking adaptability problem of the battery and the photovoltaic DC-AC converter, and realizes the effect that the battery can adapt to different voltage levels and voltage types.

What is claimed is:

1. A multi-port energy storage battery, comprising:
    a battery case, comprising a first port, a second port and a third port;
    a battery module, comprising a first interface, the first interface is connected to the first port, the battery module is configured to connect an external power supply module via the first port and the first interface, so as to charge the battery module; and the external power supply module comprises a photovoltaic DC-AC converter;
    a DC-DC converter, comprising a second interface and a third interface, wherein the second interface is connected with the first interface, and the third interface is connected with the second port; the DC-DC converter is configured to boost a battery voltage to a DC high voltage and then output the DC high voltage via the second port; and
    a DC-AC converter, comprising a fourth interface and a fifth interface, wherein the fourth interface is connected with the first interface, and the fifth interface is connected with the third port; the DC-AC converter is configured to convert a battery voltage into an alternating current and then output the alternating current via the third port.

2. The multi-port energy storage battery of claim 1, further comprising:
    a control module, comprising a first switch arranged at the second port, a second switch arranged at the third port and a microprocessor, the microprocessor is configured to control opening and closing of the first switch and the second switch.

3. The multi-port energy storage battery of claim 2, further comprising:
    a wireless communication module, connected with the microprocessor, and configured to receive a wireless control instruction to control the microprocessor.

4. The multi-port energy storage battery of claim 2, wherein the battery case further comprises a communication port, and the microprocessor is configured to be connected with an external host computer via the communication port.

5. The multi-port energy storage battery of claim 1, wherein the third interface is further connected with the fourth interface, and the fourth interface is connected with the first interface via the third interface, DC-DC converter and second interface.

6. The multi-port energy storage battery of claim 5, wherein the DC-AC converter is further configured to convert the DC high voltage into an alternating current and output the alternating current via the third port.

7. The multi-port energy storage battery of claim 1, wherein the battery module is further configured to connect the external power supply module via the second port, DC-DC converter and first interface, so as to charge the battery module.

8. The multi-port energy storage battery of claim 1, wherein the battery module is further configured to connect the external power supply module via the third port, DC-AC converter and first interface, so as to charge the battery module.

9. The multi-port energy storage battery of claim 1, wherein the battery case is configured to house the battery module, the DC-DC converter and the DC-AC converter inside the battery case.

* * * * *